(12) United States Patent
Coskun et al.

(10) Patent No.: US 10,583,490 B2
(45) Date of Patent: Mar. 10, 2020

(54) METHODS FOR PREPARING A HYBRID ARTICLE

(71) Applicant: GENERAL ELECTRIC COMPANY, Schenectady, NY (US)

(72) Inventors: Kemel Mehmet Coskun, Gebze/Kocaeli (TR); Robert Edward Hullender, Simpsonville, SC (US); Kerem Torun, Gebze/Kocaeli (TR); Onur Onder, Instanbul (TR); Christopher Edward Thompson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 91 days.

(21) Appl. No.: 16/040,027

(22) Filed: Jul. 19, 2018

(65) Prior Publication Data

US 2019/0022760 A1    Jan. 24, 2019

(30) Foreign Application Priority Data

Jul. 20, 2017    (EP) ..................... 17404002

(51) Int. Cl.
*G06F 19/00* (2018.01)
*B22F 7/06* (2006.01)
(Continued)

(52) U.S. Cl.
CPC ............ *B22F 7/062* (2013.01); *B22F 3/1055* (2013.01); *B23K 26/0006* (2013.01);
(Continued)

(58) Field of Classification Search
CPC ...... G05B 19/4099; G05B 2219/32228; G05B 2219/49023; G05B 2219/35134; G05B 2219/49007; B33Y 50/02; B33Y 50/00
See application file for complete search history.

(56) References Cited

U.S. PATENT DOCUMENTS 8,387,853 B2    3/2013    Tuppen et al.
8,668,442 B2    3/2014    Morris et al.
(Continued)

FOREIGN PATENT DOCUMENTS

CN    105081517 A    11/2015
EP    2317075 B1    5/2011
(Continued)

OTHER PUBLICATIONS

Kerschbaumer, Michael, Georg Ernst, and Paul O'Leary. "Tool path generation for 3D laser cladding using adaptive slicing technology." International Congress on Applications of Lasers & Electro-Optics. vol. 2005. No. 1. LIA, 2005. (Year: 2005).*

(Continued)

*Primary Examiner* — Michael D Masinick
(74) *Attorney, Agent, or Firm* — Charlotte C. Wilson; James W. Pemrick (57) ABSTRACT

Methods for preparing a hybrid article include disposing an additive structure comprising a plurality of layers on a build surface of a part, the build surface being defined based on x, and y coordinates, and the additive structure being defined by a three dimensional model defined by a series of planes based on x, y and z coordinates that define a plurality of layers, one layer comprising an interface surface having a contour being defined by x, and y coordinates. When the build surface and the interface surface are both oriented in space according to corresponding x, y and z coordinates, a cladding system is directed to deposit each of the sequential layers of the additive structure according to toolpaths that correspond with each of the plurality of layers of the three dimensional model.

19 Claims, 6 Drawing Sheets

(51) Int. Cl.
    *B23K 26/34*     (2014.01)
    *B23K 26/00*     (2014.01)
    *B23K 26/342*     (2014.01)
    *B23P 6/00*     (2006.01)
    *B23P 15/04*     (2006.01)
    *B23K 26/08*     (2014.01)
    *B23K 26/60*     (2014.01)
    *B22F 3/105*     (2006.01)
    *F01D 5/00*     (2006.01)
    *G05B 19/4099*     (2006.01)
    *B22F 7/08*     (2006.01)
    *B23K 101/00*     (2006.01)
    *B23P 15/00*     (2006.01)
    *B23K 103/14*     (2006.01)
    *B33Y 50/02*     (2015.01)
    *B23K 103/18*     (2006.01)
    *B33Y 10/00*     (2015.01)
    *B33Y 80/00*     (2015.01)
    *B22F 5/04*     (2006.01)

(52) U.S. Cl.
    CPC .............. *B23K 26/08* (2013.01); *B23K 26/34* (2013.01); *B23K 26/342* (2015.10); *B23K 26/60* (2015.10); *B23P 6/002* (2013.01); *B23P 6/007* (2013.01); *B23P 15/04* (2013.01); *F01D 5/005* (2013.01); *G05B 19/4099* (2013.01); *B22F 5/04* (2013.01); *B22F 7/08* (2013.01); *B22F 2003/1057* (2013.01); *B22F 2007/068* (2013.01); *B22F 2998/10* (2013.01); *B22F 2999/00* (2013.01); *B23K 2101/001* (2018.08); *B23K 2103/14* (2018.08); *B23K 2103/26* (2018.08); *B23P 15/00* (2013.01); *B33Y 10/00* (2014.12); *B33Y 50/02* (2014.12); *B33Y 80/00* (2014.12); *F05D 2230/31* (2013.01); *F05D 2230/80* (2013.01)

(56) References Cited

U.S. PATENT DOCUMENTS

| | | |
|---|---|---|
| 9,156,240 B2 | 10/2015 | Bertrand et al. |
| 9,174,312 B2 | 11/2015 | Baughman et al. |
| 9,175,568 B2 | 11/2015 | Ryan et al. |
| 9,289,826 B2 | 3/2016 | Morris et al. |
| 2004/0060639 A1 | 4/2004 | White |
| 2007/0225856 A1* | 9/2007 | Slaughter ........... G05B 19/4099 700/187 |
| 2007/0251072 A1 | 11/2007 | Beeson et al. |
| 2008/0178994 A1* | 7/2008 | Qi ......................... B22F 3/1055 156/245 |
| 2008/0260964 A1 | 10/2008 | Bagavath-Singh et al. |
| 2011/0311389 A1 | 12/2011 | Ryan et al. |
| 2012/0034101 A1 | 2/2012 | James et al. |
| 2013/0071562 A1 | 3/2013 | Szuromi et al. |
| 2013/0089642 A1* | 4/2013 | Lipson .................. A23P 20/20 426/115 |
| 2014/0199175 A1 | 7/2014 | Godfrey et al. |
| 2014/0205454 A1 | 7/2014 | Giovannetti et al. |
| 2015/0328717 A1 | 11/2015 | Shepler et al. |
| 2016/0045982 A1 | 2/2016 | Stoodt et al. |
| 2016/0069184 A1 | 3/2016 | Ribic et al. |
| 2016/0121398 A1 | 5/2016 | Schlick et al. |
| 2016/0129638 A1 | 5/2016 | Bostick et al. |
| 2016/0167172 A1 | 6/2016 | Goncharov et al. |
| 2016/0349729 A1* | 12/2016 | Fenkl ................. B23Q 17/2471 |
| 2019/0022760 A1* | 1/2019 | Coskun ............... B23K 26/342 |
| 2019/0072933 A1* | 3/2019 | Wu .................... G05B 19/4099 |

FOREIGN PATENT DOCUMENTS

| | | |
|---|---|---|
| EP | 2453030 A1 | 5/2012 |
| EP | 2752720 A1 | 7/2014 |
| EP | 2917797 A2 | 9/2015 |
| EP | 2950974 A1 | 12/2015 |
| EP | 2978952 A1 | 2/2016 |
| EP | 3015190 A1 | 5/2016 |
| EP | 3034206 A2 | 6/2016 |
| EP | 3159080 A1 | 4/2017 |
| WO | 20140175951 A1 | 10/2014 |
| WO | 20140209815 A1 | 12/2014 |
| WO | 20150017742 A1 | 2/2015 |
| WO | 20150023506 A1 | 2/2015 |
| WO | 20150053941 A1 | 4/2015 |
| WO | 20150058043 A1 | 4/2015 |
| WO | 20150112473 A1 | 7/2015 |
| WO | 20150119822 A1 | 8/2015 |
| WO | 20150161058 A1 | 10/2015 |

OTHER PUBLICATIONS

European Search Report issued in connection with corresponding EP application No. 17404002.2 dated Feb. 9, 2018.

* cited by examiner

METHODS FOR PREPARING A HYBRID ARTICLE

FIELD OF THE INVENTION

The present invention is directed to methods of preparing hybrid articles that are formed in part by additive manufacturing. More particularly, embodiments of the present invention relate to methods for preparing hybrid articles that include portions formed by an additive manufacturing cladding process, in some examples, the hybrid articles comprising components of turbine engines.

BACKGROUND OF THE INVENTION

Current component repair processes include capturing the part image by a vision system and creating a two dimensional toolpath for a single layer for laser cladding repair. That single layer cladding is repeated successively in a vertical build direction, following the same toolpath for each successive layer, to deposit a plurality of consecutively stacked layers until the desired height is achieved. Because the toolpath generation is in two dimensions, the build height and geometry is limited to the shape of the very first layer. The resultant modified part typically requires significant post processing to achieve satisfactory component repair. This involves time and resource costs, and material loss. While more complex shapes can be formed, they require the creation of discrete toolpaths for each layer, which also necessitates post formation processing, as well as material loss.

Accordingly, there is a need in the art for methods and processes that enable the formation of complex geometries of supplemental and replacement portions of a part with reduced need for post processing.

BRIEF DESCRIPTION OF THE INVENTION

In one aspect of the invention, a method for providing a hybrid article is provided. According to various embodiments, the method involves disposing an additive structure on a surface of the part where the surface is defined in space based on the x, y and z coordinates of a build surface of the part in relation to a work space. The additive structure is based on a user selected model, where the additive structure has a defined interface surface that closely corresponds with the x, y and z coordinates of the build surface, and where the user selected model defines a three dimensional structure. The method includes aligning contours of each of the build surface and the interface surface relative to the work space using a computer design system, and directing a cladding system to direct two or more cladding layers onto the build surface according to the additive structure model, where sequential layers or slices of the model define sequential toolpaths. In various embodiments, the cladding system may be one of a CNC system and a robotic device. In some embodiments the aligned contours of the build surface and the interface surface are not the same, and in some such embodiments, at least the contour of the interface surface is adapted to conform to the contour of the build surface. In some further embodiments, one or more sequential toolpaths are adapted to conform in three dimensions with the contour of the build surface.

Thus, in one embodiment method includes disposing an additive structure comprising a plurality of layers on a build surface of a part, the build surface being defined based on x, and y coordinates, and the additive structure being defined by a three dimensional model defined by a series of planes based on x, y and z coordinates that define a plurality of layers, one layer comprising an interface surface having a contour being defined by x, and y coordinates, wherein the contour of the interface surface is adapted to interface with the contour of the build surface, and wherein the additive structure has a geometry that is one of different from and conforms with a geometry of the part at least at the interface of the build surface and the interface surface, and wherein, optionally, one or more sequential layers of the additive structure is modified to conform in three dimensions with the contour of the build surface, wherein, when the build surface and the interface surface are both oriented in space according to corresponding x, y and z coordinates, a cladding system is directed to deposit each of the sequential layers of the additive structure according to toolpaths that correspond with each of the plurality of layers of the three dimensional model.

In another aspect of the invention, a method for providing a hybrid article is provided. According to the various embodiments, the method for forming a hybrid article involves disposing an additive structure on a surface of the part. More particularly, the method includes the general steps of providing a part and preparing the part for receiving the additive structure, preparing a model for defining the additive structure, and forming the additive structure as a plurality of cladding layers deposited on the build surface. In some embodiments, the method further includes inspecting the hybrid article and optionally finishing the hybrid article.

In the various embodiments, the step of providing and preparing the part for receiving an additive structure includes:

(i) selecting a build surface of the part for receiving the additive structure;
(ii) capturing a two dimensional image of the build surface;
(iii) processing data for the captured two dimensional image of the build surface to provide coordinates in three dimensions, x, y and z, and rendering a build surface contour;

In the various embodiments, the step of preparing a model for defining the additive structure includes:

(i) selecting a model for the additive structure, the selected model defining the additive structure in at least three dimensions, and including a selected interface surface;
(ii) importing the x, y and z coordinates of the build surface contour into the working environment of the model, wherein the imported coordinates correspond with x, y and z coordinates for the interface surface defined by the model;
(iii) initially aligning the interface surface of the additive structure model with the build surface contour of the part, wherein each of the interface surface of the additive structure model and the build surface contour of the part has a geometry;
(iv) finally aligning the interface surface and the build surface by one of: fitting the build surface contour directly to the interface surface; and, adjusting the geometry of the additive structure interface surface to match the geometry of the build surface contour;
(v) slicing the additive structure model along a selected axis into a plurality of layers, each layer having a preselected height, the layers including a first layer corresponding with the interface surface;

(vi) generating a discrete toolpath with laser cladding parameters for each layer of the additive structure model.

In the various embodiments, the step of forming the additive structure as a plurality of cladding layers deposited on the build surface includes:
(i) directing onto the build surface a first cladding layer according to the first toolpath;
(ii) directing, in succession, a plurality of cladding layers, each cladding layer deposited according to a toolpath corresponding with a layer of the additive structure model.

In accordance with the various embodiments, the method includes forming the hybrid article according to a process selected from laser cladding with blown powder or wire feeding.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

According to the various exemplified embodiments, provided here are methods for providing a hybrid article using an additive manufacturing (three dimensional) process involving the forming of a plurality of stacked clad layers. In accordance with the various embodiments, a program according to the inventive processes (the "toolpath generation tool" or "toolpath generation software") allows the user to direct a build onto a surface of a part to be repaired. In accordance with various embodiments the user can direct the repair according to a pre-selected build model. And in accordance with some embodiments, the user can choose to match the model to the part geometry, or use the computer program according to the inventive processes to morph the three dimensional build of the additive structure to match the geometry of the part. In this manner, a mismatch in the interface contours or overall three dimensional shape of a part and a model is not an obstacle to providing a repair build.

In some embodiments, the invention includes a process for component repairs, whereby a portion of a damaged part is removed and then replaced by the formation of an additive structure directly on the component according to the preselected model. In some embodiments the model is based on the original part design. In some particular embodiments, the model is based on an updated version of the part design. And in yet other particular embodiments, the model is based on a different component part.

In some embodiments, the invention includes forming a portion of a part onto an existing component wherein the formed portion does not correspond to a removed portion. According to the method, there is no limitation on the geometry or orientation of placement of an additive structure to a component. It will be appreciated that in some embodiments, a hybrid article may be formed by addition of a plurality of additive structures, one or more of which may be either a replacement of a removed portion or an addition of a new portion, or both.

The methods hereof are useful for any of a variety of components. In some examples, the methods are useful for the modification/repair of parts from turbine blades, particularly turbine components selected from a blade, bucket, a nozzle, and a fuel mixer. Of course, it will be appreciated that the methods can be used for repair or modification of any of a variety of manufactured parts not limited to turbine components.

The methods disclosed herein overcome the short comings of two dimensional toolpath generation tools. In various embodiments, the methods provide for the generation of any one or more of 5 axis, 3+2 axis, 3 axis and 2+1 axis programs, thus enabling the creation of complex geometries not limited to conventional two dimensional clad layers. The methods also enable positioning and depositing on to the part the build-up model with high accuracy and repeatability. And, the methods enable the performance of repairs and alterations not previously feasible, including recovery of parts deemed unsalvageable, and the creation of parts with new, hybrid features not present in the original design. Thus, in some examples, legacy parts can be upgraded using three dimensional printing according to the instant methods, enabling enhanced component performance after repair.

Methods for Forming a Hybrid Article

Figure 1:
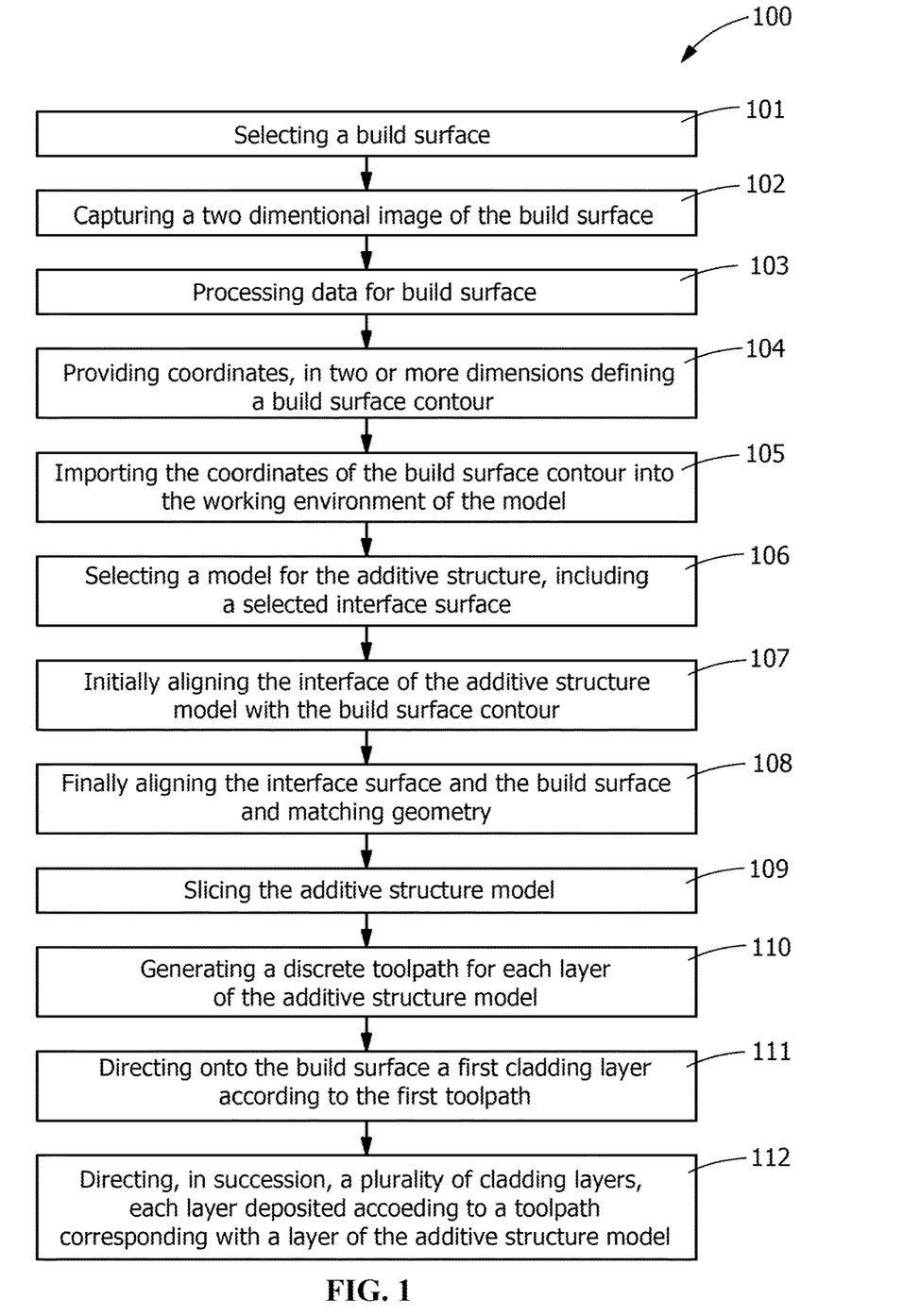
FIG. 1 is a flow chart illustrating one embodiment of a method for forming a hybrid article.

Referring now to FIG. 1, a flow diagram provides the general outline for the method of forming a hybrid article according to the instant disclosure. As shown, the method 100 includes the steps of:
selecting a build surface of the part for receiving the additive structure 101;
capturing a two dimensional image of the build surface 102;
processing data for the captured two dimensional image of the build surface to provide coordinates in three dimensions, x, y and z, and rendering a build surface contour 103;
providing coordinates, in two or more dimensions, for a build surface, the coordinates defining a build surface contour 104;
importing the coordinates of the build surface contour into the working environment of the model, wherein the imported coordinates correspond with coordinates for the interface surface defined by the model 105;

selecting a model for the additive structure, the selected model defining the additive structure in at least three dimensions, and including a selected interface surface 106;

initially aligning the interface surface of the additive structure model with the build surface contour, wherein each of the interface surface of the additive structure model and the build surface contour has a geometry 107;

finally aligning the interface surface and the build surface by one of: fitting the build surface contour directly to the interface surface; and, adjusting the geometry of the additive structure interface surface to match the geometry of the build surface contour 108;

slicing the additive structure model along a selected axis into a plurality of layers, each layer corresponding with a preselected height, the slices including a first layer corresponding with the interface surface 109;

generating a discrete toolpath for each layer of the additive structure model 110;

directing onto the build surface a first cladding layer according to the first toolpath 111; and directing, in succession, a plurality of cladding layers, each cladding layer deposited according to a toolpath corresponding with a layer of the additive structure model 112.

In some embodiments, one or more of the steps of any one or more of (I)(a)-(I)(c) are executed using a CAD program.

According to the various embodiments, the methods include providing a build surface on which an additive structure is formed. In some embodiments, a build surface is the cut plane surface of a part from which a portion of the part has been cut away. In other embodiments, the build surface may be any surface on a part. Thus, in some embodiments, the hybrid article is formed by one of replacing a removed portion of the part according to the part's original design, replacing a removed portion of the part according a new design, adding an additional portion to the part, and a combination of these.

In some embodiments, prior to the step of selecting a build surface of the part for receiving the additive structure, the method includes cutting the part at a predetermined position to remove at least a portion of the part to provide the build surface on the part for receiving the additive structure. The removed portion of the part may be removed by any of known conventional methods, including but not limited to machining and EDM. In a representative embodiment, prior to the step of selecting a build surface of the part for receiving the additive structure, the method includes cutting the part at a predetermined position to remove at least a portion of the part to provide the build surface on the part for receiving the additive structure; and selecting a model that corresponds with at least a height dimension of the removed portion. The model may be selected from the group consisting of a model corresponding to an original model for the part and a new model.

Figure 2:
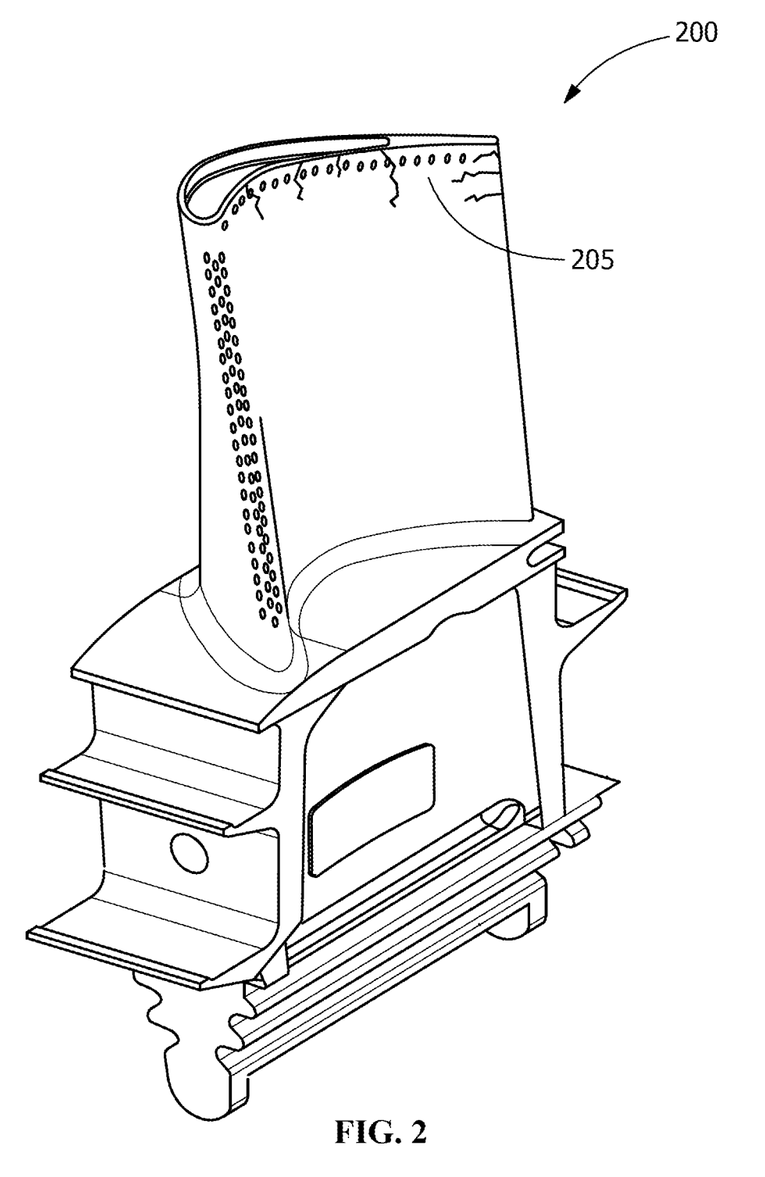
FIG. 2 depicts a representative component for repair according to the disclosed methods.
Figure 3:
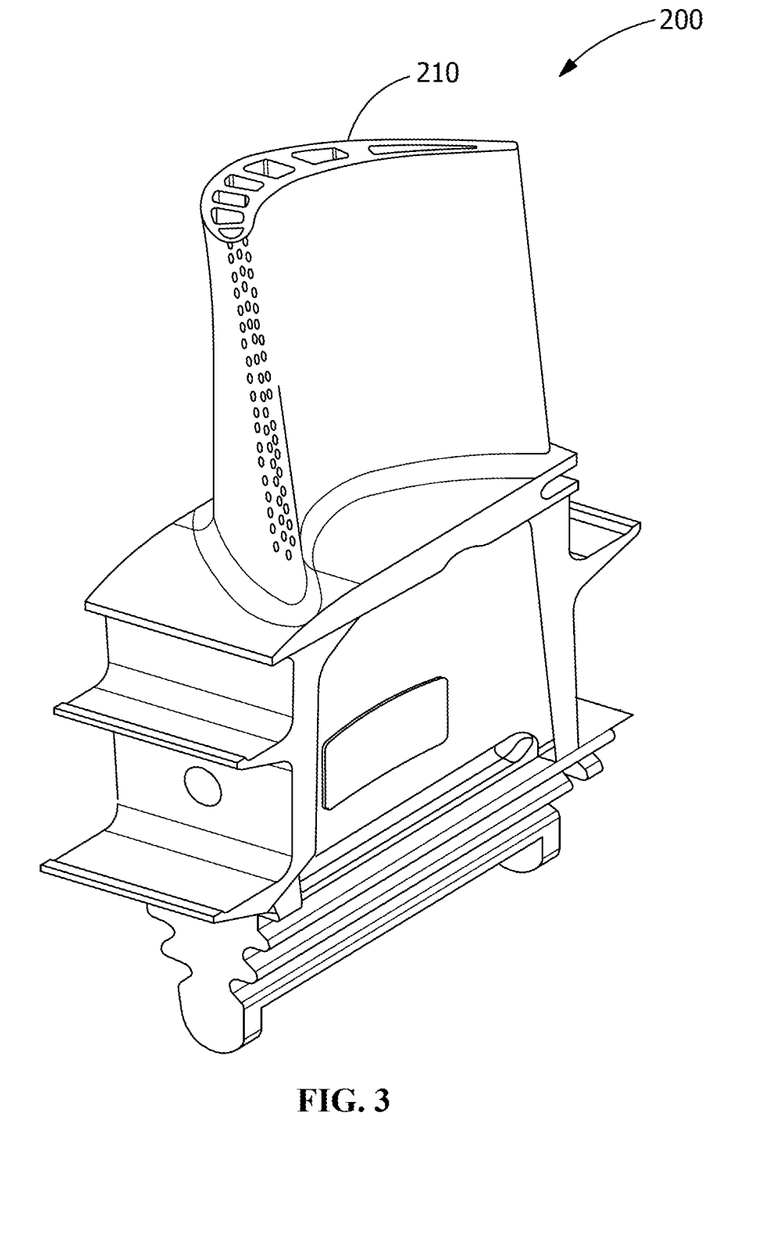
FIG. 3 depicts the component shown in FIG. 2 initially modified by removal of a portion for repair according to the disclosed methods.

Referring now to FIG. 2, an example of a part 200 that can be modified according to the processes of the disclosure is shown, wherein the part is a turbine blade 200 evidencing damage 205 adjacent the tip. According to some embodiments of the invention, the part, such as the blade 200 shown in FIG. 2, may be repaired by replacement of the damaged tip end 205, the replacement being an additive structure 245 that is based on a model selected from the original part model or another model. As shown in FIG. 3, the damaged portion 205 may be removed to provide the build surface 210.

In some embodiments, the part is positioned and oriented in a cladding machine workspace of a fabrication assembly that comprises a cladding material delivery assembly, at least one laser, an orientation assembly for orienting the build surface of the part relative to the cladding material delivery assembly, and a cladding controller.

In some embodiments, the fabrication assembly includes an image capturing assembly including a two dimensional camera or a two dimensional or three dimensional scanning or imaging device, and an image capturing and processing program. In some embodiments, the image capturing program is coupled with the laser cladding machine. In use, each coordinate in three dimensions, x, y and z, of the build surface corresponds to an x, y and z coordinate in the machine workspace. Thus, in repairing a part using a hybrid article model according to the inventive processes, an image of the build surface is captured by the vision system and the three dimensional toolpath generation software places the virtual model of the material to be added on that position. In some specific embodiments, the workspace is defined by a CNC system, wherein the toolpath generation software creates a part specific CNC program with laser parameters for the specific part. In other embodiments, the workspace is adapted for use with a robotic system for depositing the cladding layers.

Figure 4:
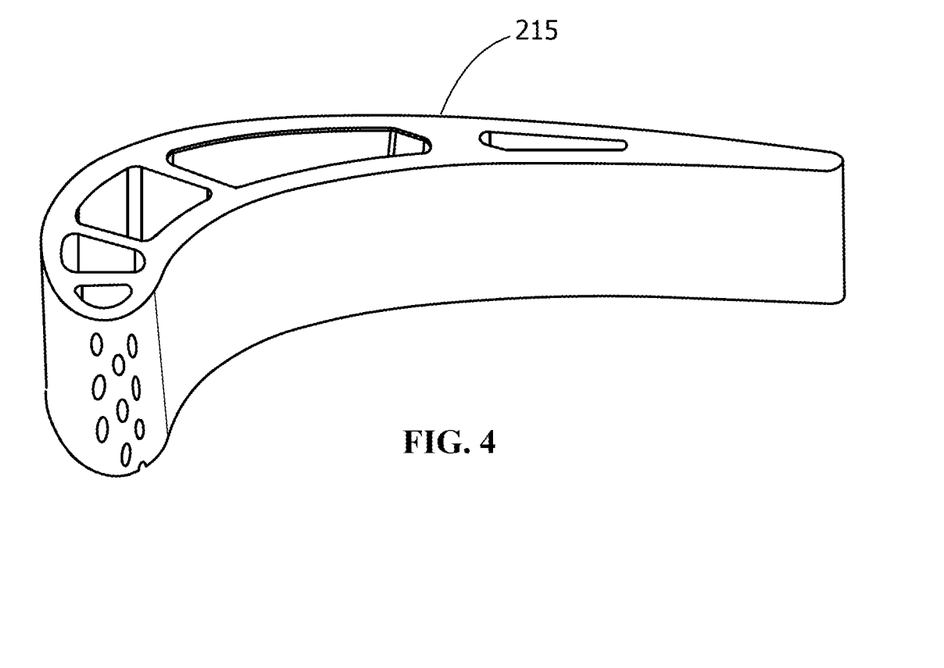
FIG. 4 depicts a model for forming an additive structure according to the disclosed methods.
Figure 5:
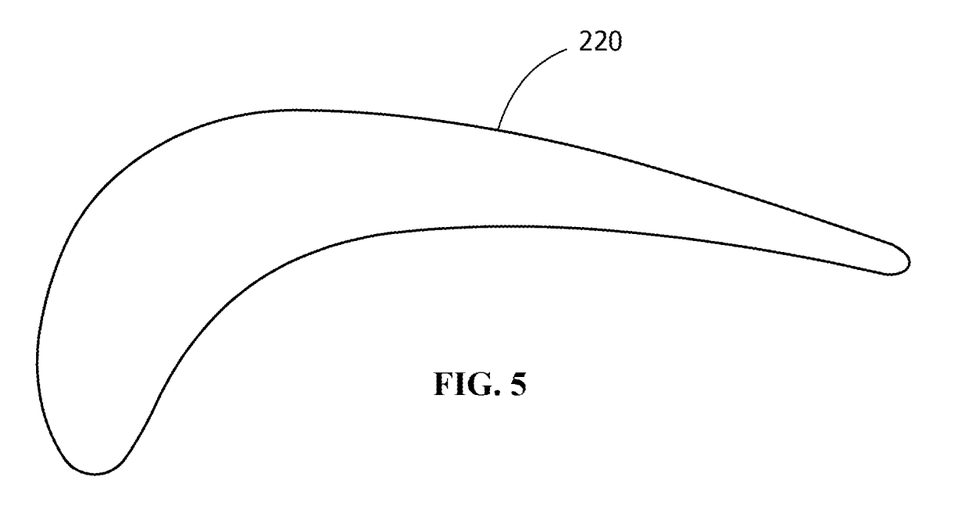
FIG. 5 is a line drawing showing a contour of a build surface shown in FIG. 3.
Figure 6:
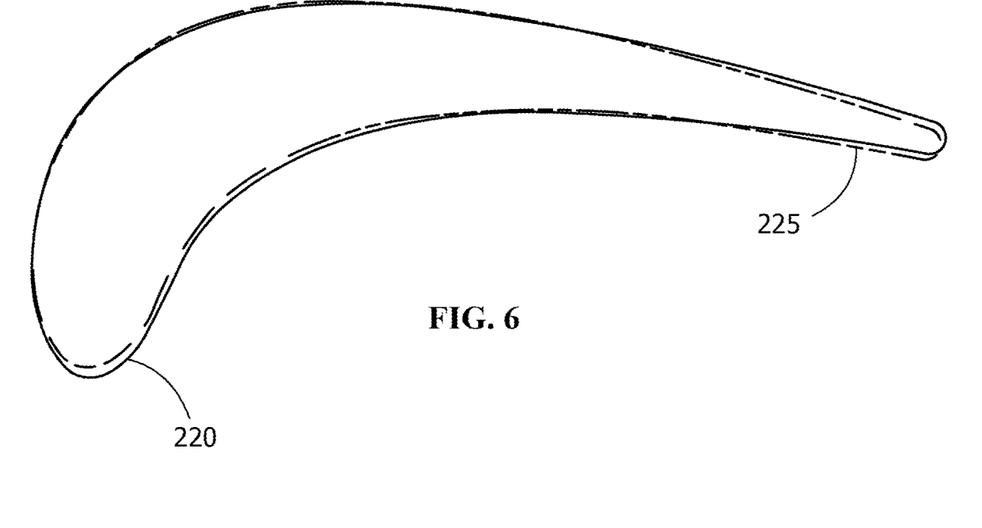
FIG. 6 is a line drawing showing a contour of the build surface shown in FIG. 3 overlaid with a contour of an interface surface of the additive structure shown in FIG. 4.
Figure 7:
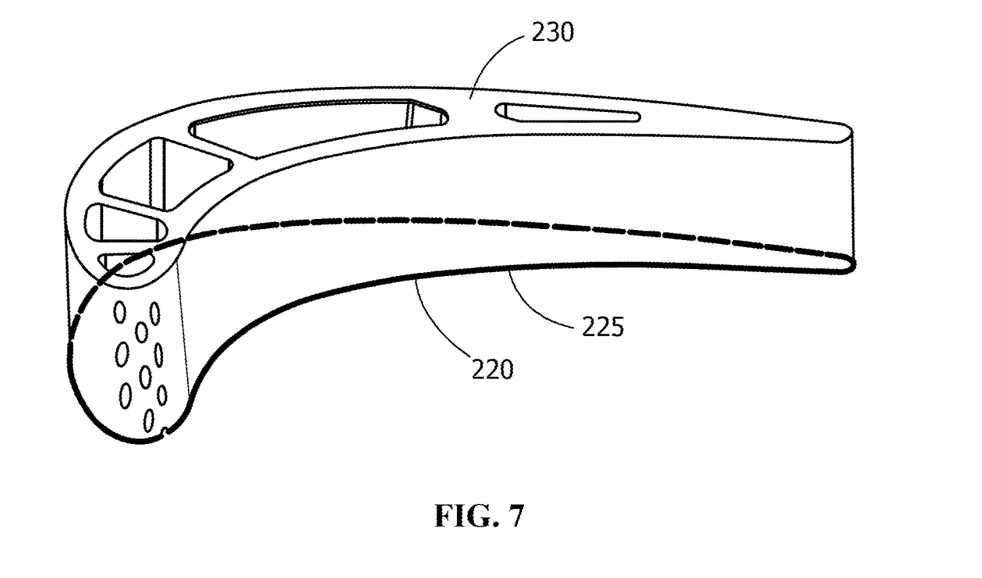
FIG. 7 is a graphic rendering of the computer models for each of the additive structure and the build surfaces showing the two models as overlaid shown in a perspective view.

Referring now to FIG. 4, an isolated portion 215 of a blade 200 is shown, corresponding in the illustration to a rendering of a model for the removed damaged portion 205 of the blade 200 in FIG. 2. In some embodiments according to the inventive processes, selecting the model for the additive structure 230 involves selection from a model that has a part geometry that is the same as a part geometry of the original part, as manufactured or as in service, and a model that has a part geometry that is different from a part geometry of the part. According to the method, the computer model for the additive structure 230, including the additive structure 245 interface surface contour 225, and the imported coordinates for the build surface contour 220 are aligned, as depicted in FIG. 6 and FIG. 7.

Figure 8:
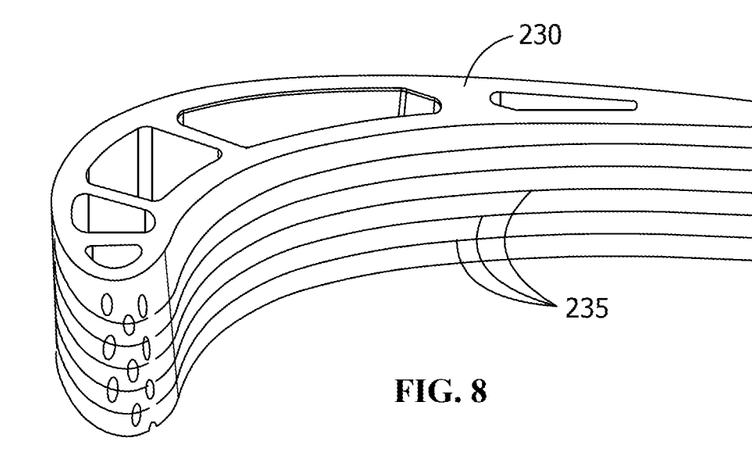
FIG. 8 is an alternate graphic rendering of the computer models for each of the additive structure and the build surfaces as overlaid shown in a perspective view; and, FIG. 9 depicts a representative hybrid article formed by repair of the component depicted in FIG. 3 according to the disclosed methods.
Figure 9:
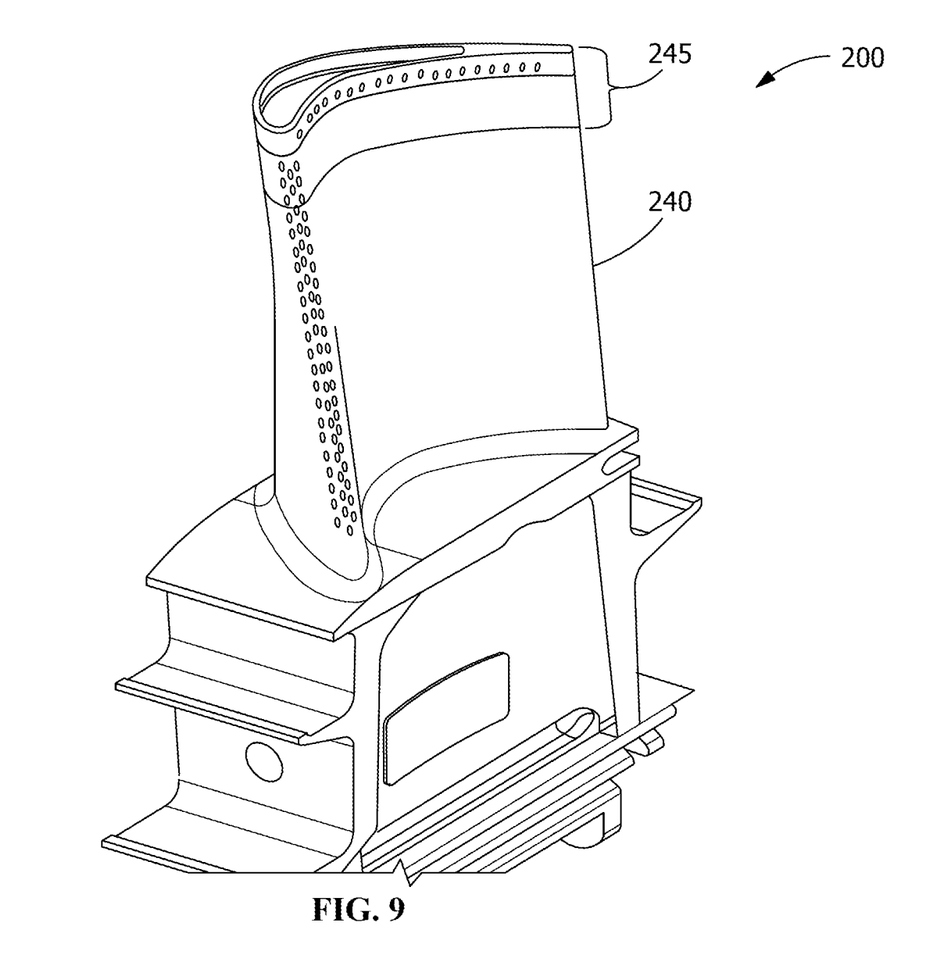

The toolpath generation tool is capable of slicing the virtual model for the additive structure 230 enabling the creation of a unique toolpath for each consecutive layer of a plurality of layers that form the additive structure 245. Referring now to FIG. 8, the depicted model for the additive structure 230 is shown with selected cut lines 235 that direct discrete toolpath coordinates for the deposit of a clad layer on the part. In accordance with the inventive processes using the toolpath generation tool, each toolpath is formed according to laser cladding parameters corresponding to each layer of the model for the additive structure 230. The resultant hybrid article comprises, in some instances, a repaired part 240, as shown in FIG. 9, wherein the damaged portion 205 has been replaced with the additive structure 245 (compare to FIG. 2 showing damaged portion, 205, and FIG. 4 which shows the isolated removed portion 215).

Used in conjunction with a visioning or laser scanning system, the three dimensional toolpath generation tool is capable of matching the three dimensional virtual model for the additive structure to the actual component and generating part specific CNC codes for use with a CNC system or otherwise direct a robotic or other cladding system. According to some embodiments, the toolpath generation tool can adaptively modify the contour of one or more of the consecutive layers of the additive structure model to match the contour of the build surface of the component. In this manner, the resultant hybrid article may be formed with the built up additive structure that follows the geometry of the original component.

In some embodiments, the cladding material delivery assembly is adapted to deliver cladding material comprising metal powder or wire. The method may include controlling laser cladding parameters selected from laser power and feedrate. In addition, one or more of the plurality of buildup layers includes extra stock to allow machining In some embodiments, the method includes finishing the hybrid article by one or more machining steps selected from the group consisting of manual grinding, adaptive CNC machining, conventional CNC machining, and combinations of these.

In some embodiments, the part is a turbine component. And in some particular embodiments, the part is a turbine component selected from the group consisting of a blade, a shroud, a nozzle, and a fuel mixer.

In a representative embodiment, the methods hereof are useful for providing a hybrid article formed from a modified or repaired turbine component, such as, for example, a shroud. According to some examples, the method includes removal of one or more portions of the component, and systematically replacing the removed portions, and optionally further processing the part to provide a hybrid article that closely matches the part according to its geometry prior to processing. Thus, in some examples, an in service part that is damaged and subject to scrapping may be reclaimed, wherein the damaged portion(s) are removed and replaced according to a model based on the original part or based on a new model for the part.

Laser Cladding

In accordance with the various embodiments, the methods hereof include use of an additive cladding process for formation of each of the plurality of discrete clad layers for forming an additive structure on a build surface of a part. In some examples, the additive methods include one or more of laser cladding with blown powder or wire feeding.

Laser cladding is a well-known technique for applying metal layers on metal substrates. It is used for one more of repairing metal components, adding structures or features to components, and providing protective surfaces, for example, to increase corrosion and wear resistance of the component. Briefly, a cladding of a powdered or wire metal material is applied on a substrate in a particular pattern in two dimensions (i.e., according to a program that defines a two dimensional path), then heating the substrate, in particular by laser radiation (e.g. scanning a laser beam over the substrate). As the metal powder absorbs energy from the laser, the powder melts and solidifies. Successive layers may be added over the initial layer of solidified metal to form a three dimensional build-up wherein each successive layer follows the two dimensional path of the initial layer.

In some particular embodiments, the material for the metal powders may include metal alloys, including nickel and cobalt-based superalloys, stainless and alloy steels, and titanium, aluminum and vanadium alloys, and combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for forming a hybrid article, comprising:
   (I) disposing a additive structure on a part to form the hybrid article, comprising steps including:
      (a) providing a part and preparing the part for receiving the additive structure, comprising steps including:
         (i) selecting a build surface of the part for receiving the additive structure;
         (ii) capturing a two dimensional image of the build surface;
         (iii) processing data for the captured two dimensional image of the build surface to provide coordinates in three dimensions, x, y and z, and rendering a build surface contour;
      (b) preparing a model for defining the additive structure, comprising steps including:
         (i) selecting a model for the additive structure, the selected model defining the additive structure in at least three dimensions, and including a selected interface surface;
         (ii) importing the x, y and z coordinates of the build surface contour into the working environment of the model, wherein the imported coordinates correspond with x, y and z coordinates for the interface surface defined by the model
         (iii) initially aligning the interface surface of the additive structure model with the build surface contour of the part, wherein each of the interface surface of the additive structure model and the build surface contour of the part has a geometry;
         (iv) finally aligning the interface surface and the build surface by one of: fitting the build surface contour directly to the interface surface; and, adjusting the geometry of the additive structure interface surface to match the geometry of the build surface contour;
         (v) slicing the additive structure model along a selected axis into a plurality of layers, each layer having a preselected height, the layers including a first layer corresponding with the interface surface;
         (vi) generating a discrete toolpath for each layer of the additive structure model;
      (c) forming the additive structure as a plurality of cladding layers deposited on the build surface, comprising steps including:
         (i) directing onto the build surface a first cladding layer according to the first toolpath;
         (ii) directing, in succession, a plurality of cladding layers, each cladding layer deposited according to a toolpath corresponding with a layer of the additive structure model; and
   (II) inspecting the hybrid article and optionally finishing the hybrid article
   wherein the method includes forming the hybrid article according to a process selected from laser cladding with blown powder or wire feeding or additive consolidation in a powder bed.

2. The method for forming a hybrid article according to claim 1, wherein step (I)(c) further includes the step comprising positioning and orienting the part in a workspace for a system selected from a CNC system and a robotic system.

3. The method for forming a hybrid article according to claim 2, wherein the workspace includes a fabrication assembly that comprises a cladding material delivery assembly, at least one laser, an orientation assembly for orienting the build surface of the part relative to the cladding material delivery assembly, and a cladding controller.

4. The method for forming a hybrid article according to claim 3, wherein the fabrication assembly includes an image capturing assembly including a two dimensional camera or two dimensional or three dimensional scanning or imaging device, and an image capturing and processing program, wherein the image capturing program is coupled with the laser cladding machine so that each coordinate in three dimensions, x, y and z, of the build surface corresponds to an x, y and z coordinate in the machine workspace, and wherein the fabrication assembly directs one or more of laser cladding parameters selected from laser power and feedrate.

5. The method for forming a hybrid article according to claim 4, wherein the cladding material delivery assembly is adapted to deliver cladding material comprising metal powder or wire.

6. The method for forming a hybrid article according to claim 4, wherein the part and the laser are maintained separated at a distance that remains constant during the step (I)(c) for forming the additive structure.

7. The method for forming a hybrid article according to claim 4, wherein one or more of the steps of any one or more of (I)(a)-(I)(c) are executed using a CAD program.

8. The method for forming a hybrid article according to claim 1, wherein the hybrid article is formed by one of replacing a removed portion of the part according to the part's original design, replacing a removed portion of the part according a new design, adding an additional portion to the part, and a combination of these.

9. The method for forming a hybrid article according to claim 1, wherein step (I)(a) further includes, prior to the step of selecting a build surface of the part for receiving the additive structure, the step comprising:
cutting the part at a predetermined position to remove at least a portion of the part to provide the build surface on the part for receiving the additive structure,
wherein the removed portion of the part is removed by one of machining and EDM.

10. The method for forming a hybrid article according to claim 1, wherein the step (I)(b) further comprises selecting the model for the additive structure from a model that has a part geometry that is the same as a part geometry of the part, and a model that has a part geometry that is different from a part geometry of the part.

11. The method for forming a hybrid article according to claim 1,
wherein, the step (I)(a) further comprises, prior to the step of selecting a build surface of the part for receiving the additive structure, the step comprising: cutting the part at a predetermined position to remove at least a portion of the part to provide the build surface on the part for receiving the additive structure; and
wherein, the step (I)(b) further comprises selecting a model that corresponds with at least a height dimension of the removed portion, the model selected from the group consisting of a model corresponding to an original model for the part and a new model.

12. The method for forming a hybrid article according to claim 1, wherein one or more of the plurality of buildup layers includes extra stock to allow machining.

13. The method for forming a hybrid article according to claim 1, wherein the step (II) further comprises finishing the hybrid article by one or more machining steps selected from the group consisting of manual grinding, adaptive CNC machining, conventional CNC machining, and combinations of these.

14. The method for forming a hybrid article according to claim 1, wherein the part is a turbine component.

15. The method for forming a hybrid article according to claim 1, wherein the part is a turbine component selected from the group consisting of a blade, a shroud, a nozzle, and a fuel mixer.

16. A method for forming a hybrid article, comprising:
(I) disposing a additive structure on a part to form the hybrid article forming the hybrid article by a process selected from laser cladding with blown powder or wire feeding or additive consolidation in a powder bed, comprising steps including:
(a) preparing the part for receiving the additive structure, comprising steps including:
(i) positioning and orienting the part in a cladding machine workspace of a fabrication assembly that comprises a cladding material delivery assembly, at least one laser, an orientation assembly for orienting the build surface of the part relative to the cladding material delivery assembly, and a cladding controller, wherein the fabrication assembly includes an image capturing assembly including a two dimensional camera or two dimensional or three dimensional scanning or imaging device, and an image capturing and processing program, wherein the image capturing program is coupled with the laser cladding machine so that each coordinate in three dimensions, x, y and z, of the build surface corresponds to an x, y and z coordinate in the machine workspace;
(ii) selecting a build surface of the part for receiving the additive structure;
(iii) capturing a two dimensional image of the build surface;
(iv) processing data for the captured two dimensional image of the build surface to provide coordinates in three dimensions, x, y and z, and rendering a build surface contour;
(b) preparing a model for defining the additive structure, comprising steps including:
(i) selecting a model for the additive structure, the selected model defining the additive structure in at least three dimensions, and including a selected interface surface;
(ii) importing the x, y and z coordinates of the build surface contour into the working environment of the model, wherein the imported coordinates correspond with x, y and z coordinates for the interface surface defined by the model;
(iii) initially aligning the interface surface of the additive structure model with the build surface contour of the part, wherein each of the interface surface of the additive structure model and the build surface contour of the part has a geometry;
(iv) finally aligning the interface surface and the build surface by one of: fitting the build surface contour directly to the interface surface; and, adjusting the geometry of the additive structure interface surface to match the geometry of the build surface contour;
(v) slicing the additive structure model along a selected axis into a plurality of layers, each layer having a preselected height, the layers including a first layer corresponding with the interface surface;

(vi) generating a discrete toolpath for each layer of the additive structure model (c) forming the additive structure as a plurality of cladding layers deposited on the build surface, comprising steps including:

(i) directing onto the build surface a first cladding layer according to the first toolpath;

(ii) directing, in succession, a plurality of cladding layers, each cladding layer deposited according to a toolpath corresponding with a layer of the additive structure model, wherein the part and the laser are maintained separated at a distance that remains constant; and wherein one or more of the steps of any one or more of (I)(a)-(I)(c) are executed using a CAD program, and wherein the forming of the cladding layers includes controlling one or more of laser cladding parameters selected from laser power and feedrate;

(II) inspecting the hybrid article and optionally finishing the hybrid article.

17. The method for forming a hybrid article according to claim 16, wherein the step (I)(a) further comprises, prior to the step of selecting a build surface of the part for receiving the additive structure, the step comprising: cutting the part at a predetermined position to remove at least a portion of the part to provide the build surface on the part for receiving the additive structure; and wherein, the step (I)(b) further comprises selecting a model that corresponds with at least a height dimension of the removed portion, the model selected from the group consisting of a model corresponding to an original model for the part and a new model.

18. The method for forming a hybrid article according to claim 17, wherein step (I)(c) further includes the step comprising positioning and orienting the part in a workspace for a system selected from a CNC system and a robotic system.

19. The method for forming a hybrid article according to claim 17, wherein the hybrid article is a turbine component, and wherein the hybrid article compromises a component substrate comprising one or more additive structures, each additive structure comprising a plurality of stacked layers of cladding material selected from metal.

* * * * *